United States Patent [19]

Whitty et al.

[11] Patent Number: 5,510,935
[45] Date of Patent: Apr. 23, 1996

[54] LENS MOUNTING TECHNIQUE

[75] Inventors: James Whitty; Brien Ross, both of Midland, Canada

[73] Assignee: Hughes Aircraft Company, Los Angeles, Calif.

[21] Appl. No.: 322,621

[22] Filed: Oct. 13, 1994

[51] Int. Cl.[6] .................................................... G02B 7/02
[52] U.S. Cl. ........................................... 359/822; 359/820
[58] Field of Search .................................. 359/819, 820, 359/822, 823

[56] References Cited

U.S. PATENT DOCUMENTS

| 4,723,833 | 2/1988 | Yamada | 359/820 |
| 5,177,641 | 1/1993 | Kobayashi et al. | 359/820 |

FOREIGN PATENT DOCUMENTS

| 58-87507 | 5/1983 | Japan | 359/820 |
| 58-178305 | 10/1983 | Japan | 359/820 |
| 59-26705 | 2/1984 | Japan | 359/820 |

*Primary Examiner*—Loha Ben
*Attorney, Agent, or Firm*—Michael W. Sales; Wanda K. Denson-Low

[57] ABSTRACT

A lens mounting system (36) comprises a lens mount (53) having a cylindrical inner surface to define an internal cavity. An annular mounting member (46) projects into the cavity and has a fixed forward facing mounting surface (48). A mounting ring (52) threadedly engaged with the inner surface is selectively movable between a withdrawn position distant from the mounting member (46) and an advanced position adjacent thereto. A lens (40) for the system includes a forward facing optical surface (42), a rearward facing optical surface (44), and an annular mounting member (46) at an interface between the first optical surface (42) and the second optical surface (44). The annular mounting member (46) includes a first forward facing mounting surface (48) for flush mating engagement with the movable mounting surface (50) of the mounting ring (52) and a second rearward facing mounting surface (54) spaced from the first mounting surface for flush mating engagement with the fixed mounting surface (56) of the mounting member (46). As the mounting ring (52), which may be threadedly engaged with the lens mount (53), is moved from the withdrawn position toward the advanced position, the lens (40) becomes rigidly supported on the lens mount (53). All of the mounting surfaces are perpendicular to an optical axis of the system.

3 Claims, 1 Drawing Sheet

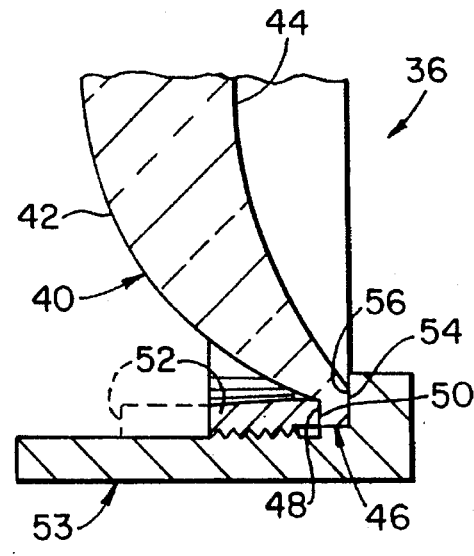
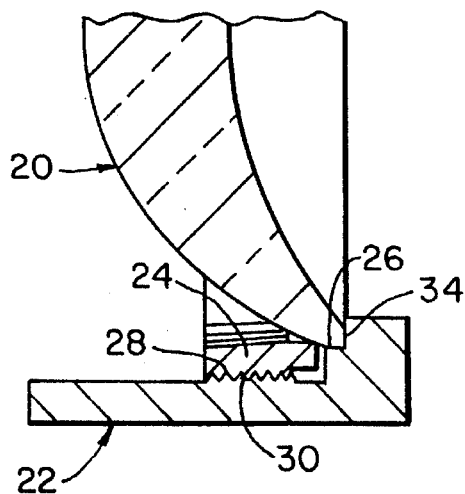
FIG. 2
PRIOR ART
FIG. 3
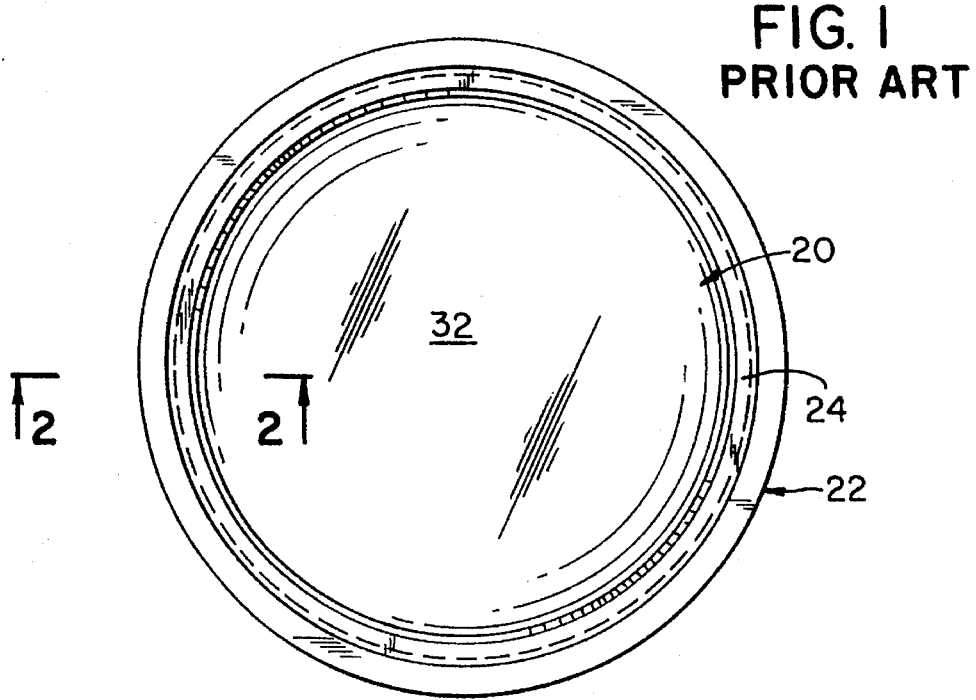
FIG. 1
PRIOR ART

LENS MOUNTING TECHNIQUE

BACKGROUND OF THE INVENTION

1. Field of the Invention

The present invention relates generally to lens mounts and more particularly, to a technique which provides accurate, firm, yet substantially stress-free mounting for a lens.

2. Description of the Prior Art

Prior lens mounting techniques comprise the use, in one instance, of epoxies and, in another instance, of screw rings mating with curved glass surfaces. Epoxies do not provide as stable centering as the mounting technique of the invention. This lack of centering capability becomes particularly acute at either cryogenic or elevated temperatures. Further, the use of screw rings on curved glass surfaces leads to stress concentrations in the glass which can lead to both performance and catastrophic failure. The steep curve on the lens results in a poor contact point, and will cause distortion of the lens surface when the screw ring is tightened. Also, a conventional lens has a very small locating diameter and face. Neither of these mounting techniques provides a precision tightly toleranced shoulder and diameter for drop-in assembly and control of centering and air spacing.

SUMMARY OF THE INVENTION

It was in light of the prior art as just described that the present invention was conceived and has now been reduced to practice. According to the invention a lens mounting system is provided which comprises a lens mount having a cylindrical inner surface to define an internal cavity. An annular mounting shoulder or member projects into the cavity and has a fixed forward facing mounting surface. A mounting ring threadedly engaged with the inner surface is selectively movable between a withdrawn position distant from the mounting member and an advanced position adjacent thereto. A lens for the system includes a forward facing optical surface, a rearward facing optical surface, and an annular mounting member at an interface between the forward facing optical surface and the rearward facing optical surface. The annular mounting member includes a first forward facing mounting surface for flush mating engagement with the movable mounting surface of the mounting ring and a second rearward facing mounting surface spaced from the first mounting surface for flush mating engagement with the fixed mounting surface of the mounting member. As the mounting ring, which may be threadedly engaged with the lens mount, is moved from the withdrawn position toward the advanced position, the lens becomes rigidly supported on the lens mount. All of the mounting surfaces are perpendicular to an optical axis of the system.

While the invention may be applied to a wide variety of lenses regardless of the manufacturing technique use, it is particularly applicable to diamond turned lenses. The ability to provide tightly toleranced referenced surfaces on the lenses will result in a cost savings through the simplification of the assembly procedure. Indeed, the additional costs of the extra surface in a diamond turned lens is minimal when compared to the assembly costs. For purposes of the invention, the diamond turned surface is extended to produce a precision shoulder and diameter. The shoulder provides a large mating surface for the screw ring and the outer lens diameter provides centering within the lens barrel. By so doing, an accurate stress-free mounting configuration is provided. The accuracy of the diamond turning process allows tight control of centering, and airspace tolerances, which permits a drop-in assembly even on tightly toleranced lenses. The wide flat shoulder eliminates stress concentrations normally associated with screw ring mounting. Mounting the screw ring against a face parallel to the lens mounting face eliminates radial stresses resulting from thermal expansion differences between the lens and the mount. The use of a screw ring rather than epoxy provides a more thermally stable design.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

BRIEF DESCRIPTION OF THE DRAWINGS

FIG. 1 is a front elevation view of a conventional lens mounting configuration;

FIG. 2 is a cross section view taken generally along line 2—2 in FIG. 1; and

FIG. 3 is a cross section view similar to FIG. 2, but illustrating a lens mounting configuration according to the invention.

DETAILED DESCRIPTION OF THE PREFERRED EMBODIMENT

Turn now to the drawings and, initially, to FIG. 1 which is a front elevation view of a conventional lens mounting configuration depicting an optical lens 20 suitably supported in a lens mount 22.

It was mentioned above that known lens mounting techniques include the use of epoxy and of screw rings. While epoxy may be acceptable for applications where tolerances are not critical and generally at ambient temperatures, it provides less than satisfactory results when subjected to cryogenic or elevated temperatures and when tolerances are critical. An application utilizing epoxy is not illustrated, however.

In FIG. 2, the use of a screw ring 24 is illustrated in combination with a conventionally constructed lens 20. In a typical fashion, the lens mount 22 is formed with an annular step 26 to accommodate the peripheral mounting region of the lens. The lens mount is internally threaded as at 28 and the screw ring 24 is externally threaded as at 30 for mating threading engagement with the threads 28. When the screw ring 24 is threadedly advanced toward the annular step 26, it moves into engagement with a presenting surface 32 of the lens 20. In the location at which the screw ring 24 engages the surface 32, the curve of the surface 32 is steep. This results in a poor contact point and will undesirably cause distortion of the surface 32 when the screw ring 24 is firmly tightened. Also, a locating face 34 on a side of the lens 20 opposite the presenting surface 32 is very small. As a result, the stresses imparted to the lens 20 are very great without providing a firm support for the lens which is unchanging over a wide range of temperatures and in environments where it is subjected to a wide range of vibrations.

Turn now to FIG. 3 which illustrates a lens mounting system 36 according to the invention. In this instance, a lens 40 constructed in accordance with the invention is seen to have a forward facing first optical surface 42 and a rearward facing second optical surface 44. The lens 40 further includes an annular mounting member 46 which is at an interface of the optical surfaces 42, 44. The mounting member 46 has a first forward facing mounting surface 48 for flush mating engagement with an aft facing surface 50 of a screw ring 52 which is generally similar to the screw ring 24. As with the screw ring 24, the screw ring 52 is externally threaded for engagement with internal threads of a cylindrical lens mount 53.

A second rearward facing mounting surface 54 is spaced from the mounting surface 48 for flush mating engagement with an annular engagement surface 56 on the lens mount 53. In actual fact, the mounting surfaces 48, 54 are perpendicular to an optical axis of the lens 40. As the mounting ring 52 is moved from a withdrawn, dashed line, position toward the advanced solid line position as illustrated in FIG. 3, the lens 40 becomes rigidly supported on the lens mount 46. By reason of this construction, greater control is also afforded to adjacent lenses in a multiple lens system. Furthermore, the lens mounting system 36 is self centering, imparts minimal stresses to the lens 40 which would otherwise undesirably caused distortions in the optical surfaces 42, 44, and favorably accommodates wide temperature fluctuations.

It is noteworthy that during cryogenic operation, the self-centering is achieved by reason of the difference in the rates of expansion between the lens and the housing. The diameters are sized and toleranced such that the housing contracts and forces the lens into its centered position without introducing excessive stress.

While a preferred embodiment of the invention has been disclosed in detail, it should be understood by those skilled in art that various other modifications may be made to the illustrated embodiments without departing from the scope of the invention as described in the specification and defined in the appended claims.

What is claimed is:

1. A lens mounting system that is self-centering at an operating temperature, said system comprising:
   a lens mount having a cylindrical inner surface defining an internal cavity;
   an annular mounting shoulder projecting into the cavity having a fixed forward facing mounting surface;
   a mounting ring having a movable rearward facing mounting surface, said mounting ring being operably engaged with said inner surface for selective movement of said movable mounting surface between a withdrawn position distant from said mounting shoulder and an advanced position adjacent said mounting shoulder;
   a lens including:
      a forward facing first optical surface;
      a rearward facing second optical surface;
      an annular mounting member at an interface between said first optical surface and said second optical surface, said annular mounting member including:
      a first forward facing mounting surface for flush mating engagement with said movable mounting surface of said mounting ring; and
      a second rearward facing mounting surface spaced from said first mounting surface for flush mating engagement with said fixed mounting surface of said mounting shoulder;
   said lens becoming rigidly supported on said lens mount as said mounting ring is moved from said withdrawn position toward said advanced position;
   said lens mount and said lens having different rates of thermal expansion such that said lens mount contracts and forces said lens into a centering position when the system is cooled to the operating temperature.

2. A lens mounting system as set forth in claim 1 including:
   screw threads formed in said inner surface of said lens mount adjacent said annular shoulder; and
   wherein said mounting ring includes a screw ring threadedly engaged with said screw threads such that rotation of said screw ring on said screw threads is effective to move said screw ring between said withdrawn position and said advances position.

3. A lens mounting system as set forth in claim 1;
   wherein said lens mount has a longitudinal axis;
   wherein said fixed mounting surface on said mounting shoulder and said movable mounting surface on said mounting ring lie in parallel planes perpendicular to said longitudinal axis; and
   wherein said first and second mounting surfaces on said lens lie in parallel planes perpendicular to said longitudinal axis.

* * * * *